US011279204B2

United States Patent
Youn et al.

(10) Patent No.: US 11,279,204 B2
(45) Date of Patent: Mar. 22, 2022

(54) VEHICLE AND METHOD FOR CONTROLLING THE SAME

(71) Applicants: Hyundai Motor Company, Seoul (KR); Kia Motors Corporation, Seoul (KR)

(72) Inventors: Seok-Young Youn, Seoul (KR); Jimin Han, Seoul (KR); Jia Lee, Seoul (KR); Kye Yoon Kim, Gunpo-si (KR); Seunghyun Woo, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 103 days.

(21) Appl. No.: 16/392,940

(22) Filed: Apr. 24, 2019

(65) Prior Publication Data

US 2020/0180396 A1 Jun. 11, 2020

(30) Foreign Application Priority Data

Dec. 11, 2018 (KR) .................. 10-2018-0159532

(51) Int. Cl.
*B60H 1/00* (2006.01)
*G06K 9/00* (2022.01)

(52) U.S. Cl.
CPC ..... *B60H 1/00742* (2013.01); *B60H 1/00821* (2013.01); *B60H 1/00871* (2013.01); *B60H 1/00892* (2013.01); *G06F 2203/011* (2013.01); *G06K 9/00302* (2013.01)

(58) Field of Classification Search
CPC ........... B60H 1/00742; B60H 1/00821; B60H 1/00871; B60H 1/00892; G06F 2203/011; G06K 9/00302; G06K 9/00308; G06K 9/00315
See application file for complete search history.

(56) References Cited

U.S. PATENT DOCUMENTS

| | | | | |
|---|---|---|---|---|
| 2006/0235753 A1* | 10/2006 | Kameyama | ........ | B60H 1/00742 705/15 |
| 2007/0007067 A1* | 1/2007 | Pollehn | .............. | B60H 1/00742 180/272 |
| 2007/0243810 A1* | 10/2007 | Browne | ............... | B60H 1/3414 454/152 |
| 2008/0073057 A1* | 3/2008 | Kojima | .............. | B60H 1/00742 165/43 |
| 2009/0098815 A1* | 4/2009 | Hotary | ............... | B60H 1/00742 454/75 |

(Continued)

*Primary Examiner* — Eric S Ruppert
*Assistant Examiner* — Hans R Weiland
(74) *Attorney, Agent, or Firm* — Slater Matsil, LLP

(57) ABSTRACT

The vehicle includes an air conditioner, a temperature sensor configured to measure an indoor temperature of the vehicle, a camera configured to obtain an image data of a passenger, and a bio-signal sensor configured to measure a bio-signal of the passenger. A controller is configured to control, when a predetermined condition is satisfied, the air conditioner to change a type of wind blowing at predetermined time intervals, to obtain emotion information corresponding to the changed type of wind based on at least one of the image data or the bio-signal, and to blow a type of wind for which a degree of positiveness of emotion information is equal to or greater than a threshold level.

24 Claims, 9 Drawing Sheets

(56) References Cited

U.S. PATENT DOCUMENTS

| | | | |
|---|---|---|---|
| 2012/0142264 A1* | 6/2012 | Sagou | B60H 1/00742 454/75 |
| 2015/0313475 A1* | 11/2015 | Benson | B60H 1/00742 297/217.3 |
| 2016/0001781 A1* | 1/2016 | Fung | G06K 9/00845 701/36 |
| 2016/0016454 A1* | 1/2016 | Yang | B60H 1/00742 701/36 |
| 2017/0200449 A1* | 7/2017 | Penilla | G06K 9/00302 |
| 2017/0334263 A1* | 11/2017 | Schumacher | B60H 1/00892 |
| 2017/0349027 A1* | 12/2017 | Goldman-Shenhar | B60H 1/00742 |
| 2018/0061415 A1* | 3/2018 | Penilla | G06K 9/00302 |
| 2018/0174457 A1* | 6/2018 | Taylor | G06K 9/00302 |
| 2019/0382026 A1* | 12/2019 | Mochizuki | B60H 1/00742 |
| 2020/0062074 A1* | 2/2020 | Macneille | B60H 1/00742 |
| 2020/0208867 A1* | 7/2020 | Emoto | G06F 3/015 |
| 2020/0231165 A1* | 7/2020 | Miura | B60H 1/00742 |

* cited by examiner

FIG. 4

| EXPRESSION | Disgust | Anger | Fear | Anxiety | Sadness | Stress | Frustration | Boredom | Neutral | Interest | Distress | Platonic Love | Romantic Love | Pleasure | Joy |
|---|---|---|---|---|---|---|---|---|---|---|---|---|---|---|---|
| EXPRESSION 1 | .65 | .87 | .35 | .88 | .14 | | | | .63 | .53 | | | | | .33 |
| EXPRESSION 2 | .01 | 0.09 | .11 | | .54 | | .31 | .51 | .61 | | | | | | .97 |
| EXPRESSION 3 | .70 | | .90 | | .19 | .87 | | | | | | | | | |

| INDOOR TEMPERATURE (°C) | BLOOD PRESSURE (mmHg) | HEART RATE (TIMES/MINUTE) | SWEAT RATE | BODY TEMPERATURE (°C) | EMOTIONAL STATE | TEMPERATURE (°C) | DIRECTION |
|---|---|---|---|---|---|---|---|
| 25°C OR HIGHER | 90/60 | 100 OR MORE | LARGE | 36°C OR HIGHER | NEGATIVE (UNPLEASANT, TIRED, EXCITED) | 25°C OR HIGHER | UPPER PART |
| 25°C | 120/80 | 60~100 | INTERMEDIATE | 36.5°C | POSITIVE OR NEUTRAL | 25°C | MIDDLE PART |
| 25°C OR LOWER | 140/90 | 60 OR LESS | SMALL | 36.5°C OR LOWER | NEGATIVE (SURPRISED, STRAINED, FEARFUL) | 25°C OR LOWER | LOWER PART/ MIDDLE PART |

.# VEHICLE AND METHOD FOR CONTROLLING THE SAME

CROSS-REFERENCE TO RELATED APPLICATIONS

This application claims priority to Korean Patent Application No. 10-2018-0159532, filed on Dec. 11, 2018, which application is hereby incorporated herein by reference.

TECHNICAL FIELD

Embodiments of the disclosure relate to a vehicle that controls an air conditioner based on a passenger's emotion, and a method for controlling the vehicle.

BACKGROUND

A vehicle is equipped with an air conditioner (heating ventilation and air conditioning, HVAC) capable of controlling the temperature of an indoor space by supplying cold air or warm air to the indoor space.

Generally, the air conditioner includes a compressor, a condenser, an expansion valve, and a heat exchanger, and the compressor, the condenser expansion valve, and the heat exchanger are connected to each other through at least one refrigerant passage. A refrigerant flows through the compressor, the condenser, the expansion valve, and the heat exchanger along the refrigerant passage. The air conditioner obtains cold air or warm air depending on changes in state of the flowing refrigerant, and provides the cold air or warm air to the indoor space of the vehicle through a fan.

In recent years, an air conditioner having a full automatic temperature control (FATC) function is used. However, the air conditioner operates without variation in a predetermined state to maintain a predetermined temperature, which may cause passengers' dissatisfaction.

SUMMARY

Therefore, it is an aspect of the disclosure to provide a vehicle for providing in-vehicle air conditioning in real time based on at least one of an indoor temperature, a passenger's bio-signal, or a passenger's emotion to induce the passenger's satisfaction, and a method for controlling the vehicle.

Additional aspects of the disclosure will be set forth in part in the description which follows and, in part, will be obvious from the description, or may be learned by practice of the disclosure.

In accordance with an aspect of the disclosure, there is provided a vehicle including an air conditioner, a temperature sensor configured to measure an indoor temperature of the vehicle, a camera configured to obtain an image data of a passenger, and a bio-signal sensor configured to measure a bio-signal of the passenger. A controller is configured to control, when a predetermined condition is satisfied, the air conditioner to change a type of wind blowing at predetermined time intervals, to obtain emotion information corresponding to the changed type of wind based on at least one of the image data or the bio-signal, and to blow a type of wind for which a degree of positiveness of emotion information is equal to or greater than a threshold level.

The controller may be configured to determine a type of wind for which a degree of negativeness of emotion information is equal to or greater than the threshold level, based on the emotion information corresponding to the changed type of wind, and to control the air conditioner to blow another type of wind except for the determined type of wind.

The type of wind may be classified according to at least one of a temperature, strength, or direction of wind blowing to the inside of the vehicle.

The controller may be configured to obtain, when the passenger enters the vehicle, emotion information representing the passenger's emotion based on at least one of the image data or the bio-signal, and to control the air conditioner to blow a type of wind corresponding to at least one of the indoor temperature, the bio-signal, or the emotion information.

The controller may be configured to obtain, when the type of wind blowing at the predetermined time intervals changes, emotion information corresponding to each type of wind based on at least one of the image data or the bio-signal.

The predetermined condition may include when a predetermined time elapses from when wind starts being blown through the air conditioner, or when a degree of positiveness of emotion information obtained after wind starts being blown through the air conditioner is equal to or greater than the threshold level.

The controller may be configured to determine, when the indoor temperature is equal to or higher than a predetermined temperature, a type of wind that is below the predetermined temperature and directed to an upper part of the passenger, as a predetermined type of wind corresponding to the indoor temperature, and to determine, when the indoor temperature is lower than the predetermined temperature, a type of wind that is above the predetermined temperature and directed to a middle or lower part of the passenger, as a predetermined type of wind corresponding to the indoor temperature.

The controller may be configured to determine, when the bio-signal is a bio-signal appearing at a predetermined temperature or higher, a type of wind that is below a predetermined temperature and directed to an upper part of the passenger, as a predetermined type of wind corresponding to the bio-signal, and to determine, when the bio-signal is a bio-signal appearing at a temperature that is lower than the predetermined temperature, a type of wind that is above the predetermined temperature and directed to a middle or lower part of the passenger, as a predetermined type of wind corresponding to the bio-signal.

The bio-signal sensor may include at least one of a heart rate (HR) sensor configured to measure a heart rate of the passenger, a skin temperature sensor configured to measure a skin temperature of the passenger, a galvanic skin response (GSR) sensor configured to measure skin electrical conductivity depending on a sweat rate of the passenger, or a blood pressure measurement sensor configured to measure blood pressure of the passenger.

The controller may be configured to determine, when the emotion information represents a predetermined emotion appearing at a predetermined temperature or higher, a type of wind that is below the predetermined temperature and directed to an upper part of the passenger, as a predetermined type of wind corresponding to the emotion information, and to determine, when the emotion information represents a predetermined emotion appearing at a temperature that is lower than the predetermined temperature, a type of wind that is above the predetermined temperature and directed to a middle or lower part of the passenger, as a predetermined type of wind corresponding to the emotion information.

The vehicle may further include a seat sensor provided in each of a plurality of seats and configured to detect the passenger on the seat. The controller may be configured to detect at least one passenger entered the vehicle based on at least one of the bio-signal, the image data, or a measured value of the seat sensor.

The controller may be configured to control the air conditioner to blow a predetermined type of wind through an air vent corresponding to the seat on which the at least one passenger is positioned, based on at least one of the indoor temperature, a bio-signal of the at least one passenger or emotion information of the at least one passenger.

The controller may be configured to determine a passenger having a highest degree of negativeness based on emotion information of each of the at least one passenger, and to control the air conditioner based on at least one of the indoor temperature, a bio-signal of the determined passenger or emotion information of the determined passenger.

In accordance with another aspect of the disclosure, there is provided a method of controlling a vehicle, the vehicle including an air conditioner, a temperature sensor configured to measure an indoor temperature of the vehicle, a camera configured to obtain image data of a passenger, and a bio-signal sensor configured to measure a bio-signal of the passenger, the method including: controlling, when a predetermined condition is satisfied, the air conditioner to change a type of wind blowing at predetermined time intervals; and obtaining emotion information corresponding to the changed type of wind based on at least one of the image data or the bio-signal, and controlling the air conditioner to blow a type of wind for which a degree of positiveness of emotion information is equal to or greater than a threshold level.

The method may further include: determining a type of wind for which a degree of negativeness of emotion information is equal to or greater than the threshold level, based on the emotion information corresponding to the changed type of wind; and controlling the air conditioner to blow another type of wind except for the determined type of wind.

The type of wind may be classified according to at least one of a temperature, strength, or direction of wind blowing to the inside of the vehicle.

The method may further include: obtaining, when the passenger enters the vehicle, emotion information representing the passenger's emotion based on at least one of the image data or the bio-signal; and controlling the air conditioner to blow a type of wind corresponding to at least one of the indoor temperature, the bio-signal, or the emotion information.

The method may further include obtaining, when the type of wind blowing at the predetermined time intervals changes, emotion information corresponding to each type of wind based on at least one of the image data or the bio-signal.

The predetermined condition may include: when a predetermined time elapses from when wind starts being blown through the air conditioner, or when a degree of positiveness of emotion information obtained after wind starts being blown through the air conditioner is equal to or greater than the threshold level.

The method may further include: determining, when the indoor temperature is equal to or higher than a predetermined temperature, a type of wind that is below the predetermined temperature and directed to an upper part of the passenger, as a predetermined type of wind corresponding to the indoor temperature; and determining, when the indoor temperature is lower than the predetermined temperature, a type of wind that is above the predetermined temperature and directed to a middle or lower part of the passenger, as a predetermined type of wind corresponding to the indoor temperature.

The method may further include: determining, when the bio-signal is a bio-signal appearing at a predetermined temperature or higher, a type of wind that is below a predetermined temperature and is directed to an upper part of the passenger, as a predetermined type of wind corresponding to the bio-signal; and determining, when the bio-signal is a bio-signal appearing at a temperature that is lower than the predetermined temperature, a type of wind that is above the predetermined temperature and directed to a middle or lower part of the passenger, as a predetermined type of wind corresponding to the bio-signal.

The bio-signal sensor may include at least one of a heart rate (HR) sensor configured to measure a heart rate of the passenger, a skin temperature sensor configured to measure a skin temperature of the passenger, a galvanic skin response (GSR) sensor configured to measure skin electrical conductivity depending on a sweat rate of the passenger, or a blood pressure measurement sensor configured to measure blood pressure of the passenger.

The method may further include: determining, when the emotion information represents a predetermined emotion appearing at a predetermined temperature or higher, a type of wind that is below the predetermined temperature and directed to an upper part of the passenger, as a predetermined type of wind corresponding to the emotion information; and determining, when the emotion information represents a predetermined emotion appearing at a temperature that is lower than the predetermined temperature, a type of wind that is above the predetermined temperature and directed to a middle or lower part of the passenger, as a predetermined type of wind corresponding to the emotion information.

The vehicle may further include a seat sensor provided in each of a plurality of seats and configured to detect the passenger on the seat, the method further including detecting at least one passenger entered the vehicle based on at least one of the bio-signal, the image data, or a measured value of the seat sensor.

The method may further include controlling the air conditioner to blow a predetermined type of wind through an air vent corresponding to the seat on which the at least one passenger is positioned, based on at least one of the indoor temperature, a bio-signal of the at least one passenger or emotion information of the at least one passenger.

The method may further include: determining a passenger having a highest degree of negativeness based on emotion information of each of the at least one passenger; and controlling the air conditioner based on at least one of the indoor temperature, a bio-signal of the determined passenger or emotion information of the determined passenger.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 shows correlation information between facial expressions and emotion factors according to an embodiment of the disclosure;

FIG. 6 is a view for describing an air conditioner that is controlled in a vehicle according to an embodiment of the disclosure;

DETAILED DESCRIPTION OF ILLUSTRATIVE EMBODIMENTS

Figure 1:
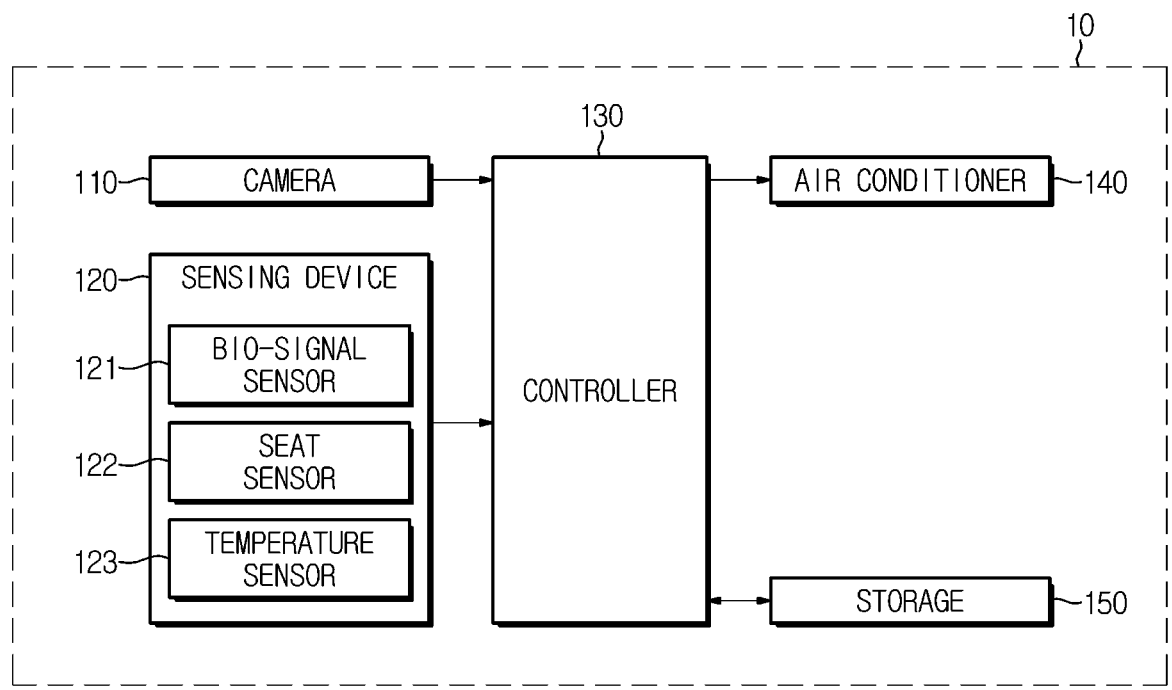
FIG. 1 is a control block diagram of a vehicle according to an embodiment of the disclosure.

Like numbers refer to like elements throughout this specification. This specification does not describe all components of the embodiments, and general information in the technical field to which the disclosure belongs or overlapping information between the embodiments will not be described.

It will be understood that when a component is referred to as being "connected" to another component, it can be directly or indirectly connected to the other component. When a component is indirectly connected to another component, it may be connected to the other component through a wireless communication network.

Also, it will be understood that when the terms "includes," "comprises," "including," and/or "comprising," when used in this specification, specify the presence of a stated component, but do not preclude the presence or addition of one or more other components.

Also, it is to be understood that the singular forms "a," "an," and "the" include plural referents unless the context clearly dictates otherwise.

As used herein, the terms "portion", "unit", "block", "member", or "module" refers to a unit that can perform at least one function or operation. For example, the terms may mean at least one software stored in memory or at least one hardware, such as a Field Programmable Gate Array (FPGA) or an Application Specific Integrated Circuit (ASIC), or at least one process that is processed by a processor.

Reference numerals used in operations are provided for convenience of description, without describing the order of the operations, and the operations can be executed in a different order from the stated order unless a specific order is definitely specified in the context.

Hereinafter, embodiments of a vehicle according to an aspect and a method of controlling the vehicle will be described in detail with reference to the accompanying drawings.

Figure 2:
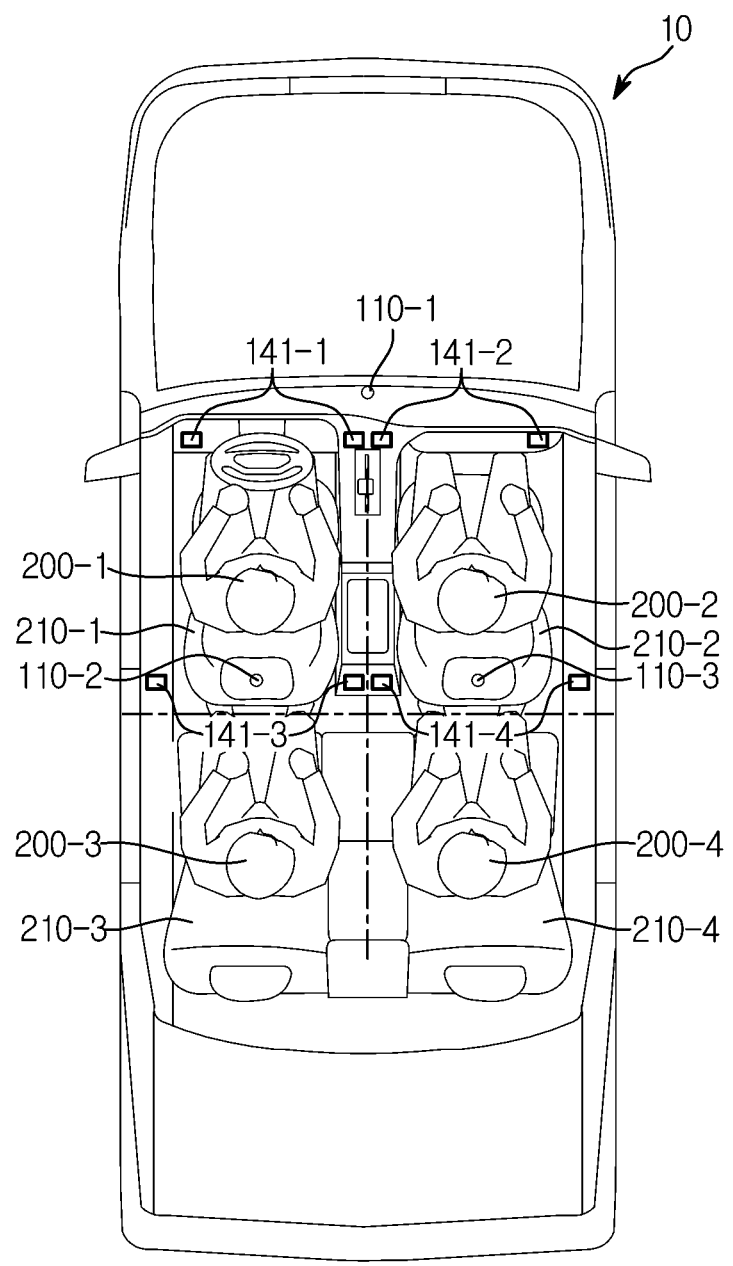
FIG. 2 shows an interior of a vehicle according to an embodiment of the disclosure.

FIG. 1 is a control block diagram of a vehicle according to an embodiment of the disclosure, and FIG. 2 shows an interior of a vehicle according to an embodiment of the disclosure.

Referring to FIG. 1, a vehicle 10 according to an embodiment of the disclosure may include a camera 110 for obtaining image data of a passenger, a sensing device 120 including a bio-signal sensor 121 for measuring a passenger's bio-signal, a seat sensor 122 for detecting a passenger on a seat, and a temperature sensor 123 for measuring an indoor temperature of an indoor space of the vehicle 10, a controller 130 for obtaining emotion information representing the passenger's emotion based on the image data or the bio-signal (i.e., the image data or the bio-signal or both) and controlling an air conditioner 140 based on at least one of the indoor temperature, the passenger's bio-signal, or the passenger's emotion information, the air conditioner 140 for blowing wind (warm or cold air) to the indoor space of the vehicle 10 under the control of the controller 130, and a storage 150 for storing various information required for operations of the vehicle 10.

The camera 110 may photograph the passenger in the vehicle 10 to obtain the image data of the passenger. The image data of the passenger may include information about the passenger's facial expression.

The camera 110 may include a plurality of lenses and an image sensor. The image sensor may include a plurality of photodiodes for converting light into electrical signals, and the plurality of photodiodes may be arranged in a two-dimensional matrix.

In addition, the camera 110 may be an infrared camera for photographing a passenger during night driving.

Referring to FIG. 2, the camera 110 (110-1, 110-2, 110-3) may be installed on a dashboard, a windshield or a seat 210 (210-1, 210-2, 210-3, 210-4). However, there is no limitation on the installation position and number of the camera 110. Image data of a passenger 200 (200-1, 200-2, 200-3, 200-4), obtained by the camera 110, may be used by the controller 130 to understand a facial expression of the passenger 200 and detect a position of the passenger 200. Therefore, the camera 110 may be installed in front of the passenger 200.

The sensing device 120 according to an embodiment of the disclosure may include the bio-signal sensor 121 for measuring the bio-signal of the passenger 200, the seat sensor 122 for detecting the passenger 200 on the seat 210, and the temperature sensor 123 for measuring the indoor temperature of the indoor space of the vehicle 10.

The bio-signal sensor 121 according to an embodiment of the disclosure may measure a bio-signal of each passenger 200 in the vehicle 10. The bio-signal of the passenger 200 may be transmitted to the controller 130 and stored in the storage 150.

The bio-signal sensor 121 may be installed at various positions in the vehicle 10. For example, the bio-signal sensor 121 may be provided on the seat 210, a seat belt (not shown), a steering wheel (not shown), and a handle (not shown) provided on a door. In addition, a position of the passenger 200 may be determined based on a position at which the bio-signal sensor 121 is installed and information obtained by the bio-signal sensor 121.

The bio-signal sensor 121 may include at least one of a galvanic skin response (GSR) sensor for measuring skin electrical conductivity depending on a sweat rate of the passenger 200, a skin temperature sensor for measuring a skin temperature of the passenger 200, a heart rate (HR) sensor for measuring a heart rate of the passenger 200, an electroencephalogram (EEG) sensor for measuring brainwaves of the passenger 200, a voice recognition sensor for measuring a voice signal of the passenger 200, a blood pressure measurement sensor for measuring a blood pressure of the passenger 200, or an eye tracker for tracking the positions of pupils. However, sensors that may be included in the bio-signal sensor 121 are not limited to the abovementioned sensors, and the bio-signal sensor 121 may include another sensor capable of measuring a person's bio-signal.

The seat sensor 122 according to an embodiment of the disclosure may detect the passenger 200 on the seat 210. More specifically, the seat sensor 122 may be provided on the seat 210, and the seat sensor 122 may be a pressure sensor to determine whether there is a passenger based on pressure applied on the seat 210. That is, the seat sensor 122 may transmit a measured value to the controller 130, and the controller 130 may determine whether a passenger is seated on the seat 210 based on the measured value received from the seat sensor 122.

The temperature sensor 123 according to an embodiment of the disclosure may be provided in the vehicle 10 to measure an indoor temperature of the indoor space of the vehicle 10. The temperature sensor 123 may correspond to an electronic temperature measuring device. The temperature sensor 123 may transfer the measured indoor temperature to the controller 130, and the controller 130 may control the air conditioner 140 based on the indoor temperature.

The controller 130 according to an embodiment of the disclosure may obtain emotion information representing an emotion of the passenger 200 based on at least one of the image data or the bio-signal, and control the air conditioner 140 based on at least one of the indoor temperature, the bio-signal of the passenger 200, or the emotion information of the passenger 200.

More specifically, the controller 130 may understand a facial expression of the passenger 200 based on the image data of the passenger 200, and obtain the emotion information corresponding to the facial expression. A configuration for obtaining emotion information of the passenger 200 based on image data will be described in detail, later.

In addition, the controller 130 may obtain emotion information corresponding to the bio-signal of the passenger 200 based on the bio-signal of the passenger 200. A configuration for obtaining emotion information of the passenger 200 based on a bio-signal will be described in detail, later.

The controller 130 according to an embodiment of the disclosure may control the air conditioner 140 to blow a predetermined type of wind based on at least one of the indoor temperature, the bio-signal of the passenger 200, or the emotion information of the passenger 200. Types of wind may be classified according to at least ones of temperatures, strengths, or directions of wind blowing to the inside of the vehicle 10.

More specifically, when an indoor temperature is equal to or higher than a predetermined temperature (for example, 25° C.), the controller 130 may determine wind that is below the predetermined temperature and directed to a upper part of the passenger 200, as a predetermined type of wind corresponding to the indoor temperature, and when an indoor temperature is lower than the predetermined temperature, the controller 130 may determine wind that is above the predetermined temperature and directed to a middle or lower part of the passenger 200, as a predetermined type of wind corresponding to the indoor temperature.

In addition, when a bio-signal is a bio-signal appearing at a predetermined temperature or higher, the controller 130 may determine wind that is below the predetermined temperature and directed to the upper part of the passenger 200, as a predetermined type of wind corresponding to the bio-signal, and when a bio-signal is a bio-signal appearing at a temperature that is lower than the predetermined temperature, the controller 130 may determine wind that is above the predetermined temperature and directed to the middle or lower part of the passenger 200, as a predetermined type of wind corresponding to the bio-signal.

Also, when emotion information represents a predetermined emotion appearing at the predetermined temperature or higher, the controller 130 may determine the wind that is below the predetermined temperature and directed to the upper part of the passenger 200, as a predetermined type of wind corresponding to the emotion information, and when emotion information represents a predetermined emotion appearing at a temperature that is lower than the predetermined temperature, the controller 130 may determine wind that is above the predetermined temperature and directed to the middle or lower part of the passenger 200, as a predetermined type of wind corresponding to the emotion information.

The controller 130 may control the air conditioner 140 to change the type of wind blowing at predetermined time intervals when a predetermined condition is satisfied.

The predetermined condition may be when a predetermined time elapses from when wind starts being blown through the air conditioner 140, or when a degree of positiveness of emotion information obtained after wind starts being blown through the air conditioner 140 is equal to or greater than a threshold level.

The controller 130 according to an embodiment of the disclosure may also obtain emotion information of the passenger 200 corresponding to each type of wind based on at least one of image data or a bio-signal, when the type of wind blowing at predetermined time intervals changes.

The controller 130 may determine a type of wind for which a degree of negativeness of emotion information is equal to or greater than the threshold level, and control the air conditioner 140 to blow another type of wind except for the determined type of wind.

That is, the controller 130 may obtain emotion information corresponding to each of types of wind changing at predetermined time intervals based on at least one of image data or a bio-signal, and control the air conditioner 140 to blow a type of wind for which a degree of positiveness of emotion information is equal to or greater than the threshold level.

However, according to some embodiments, the controller 130 may determine that a change in emotion indicated by emotion information of the passenger 200 is not due to a change in type of wind blowing from the air conditioner 140.

More specifically, the controller 130 may determine whether an emotion of the passenger 200 changes according to current circumstance information, based on circumstance information obtained through various sensors installed in the vehicle 10. When the emotion of the passenger 200 changes according to the current circumference information, the controller 130 may determine that a change in emotion indicated by the emotion information of the passenger 200 is not due to a change in type of wind blowing from the air conditioner 140.

In this case, the controller 130 may not control the air conditioner 140 based on the emotion information of the passenger 200.

For example, the controller 130 may determine that the vehicle 10 is in a traffic congestion state, based on a camera photographing a front view or a communicator communicating with an external server, and determine that a change in emotion according to emotion information obtained from a time when the traffic congestion state occurs is not due to a change in type of wind blowing from the air conditioner 140.

As another example, the controller 130 may determine that the passenger 200 is talking on the phone, based on a microphone installed in the vehicle 10, and determine that a change in emotion according to emotion information obtained from a time when the talking on the phone occurs is not due to a change in type of wind blowing from the air conditioner 140.

As another example, the controller 130 may determine that the vehicle 10 makes to a sudden stop, based on a brake position sensor installed in the vehicle 10 and determine that a change in emotion according to emotion information obtained from a time when the sudden stop occurs is not due to a change in type of wind blowing from the air conditioner 140.

The controller 130 according to an embodiment of the disclosure may detect at least one passenger in the vehicle 10 based on at least one of a bio-signal, image data, or a measured value obtained by the seat sensor 122.

The controller 130 according to an embodiment of the disclosure may also control the air conditioner 140 to blow a predetermined type of wind through an air vent 141 (141-1, 141-2, 141-3, 141-4) corresponding to a seat 210 on which at least one passenger sits, based on at least one of an indoor temperature, a bio-signal of the at least one passenger, or emotion information of the at least one passenger.

In addition, the controller 130 according to another embodiment of the disclosure may determine a passenger having a highest degree of negativeness based on emotion information of the at least one passenger, and control the air conditioner 140 based on at least one of an indoor temperature, a bio-signal of the determined passenger, or emotion information of the determined passenger.

The controller 130 may include at least one memory storing a program for performing the above-described operations and operations which will be described below, and at least one processor for executing the stored program. When there are a plurality of memories and processors, they may be integrated into one chip or provided at physically separated positions.

The air conditioner 140 according to an embodiment of the disclosure may be provided in the vehicle 10 to blow wind (warm air or cool air) to the indoor space of the vehicle 10 under the control of the controller 130.

More specifically, the air conditioner 140 may include a compressor, a condenser, an expansion valve, and a heat exchanger, and the compressor, the condenser expansion valve, and the heat exchanger may be connected to each other through at least one refrigerant passage. A refrigerant may flow through the compressor, the condenser, the expansion valve, and the heat exchanger along the refrigerant passage, and the air conditioner 140 may obtain cold air or warm air depending on a change in state of the flowing refrigerant. The cold air or warm air may be provided to the indoor space of the vehicle 10 through a fan.

For this, the air conditioner 140 may include a plurality of air vents 141 (141-1, 141-2, 141-3, 141-4) provided in the vehicle 10. Referring to FIG. 2, a first air vent 141-1 may be provided in a driver's seat 210-1. For example, a pair of first air vents 141-1 may be positioned in the dashboard at left and right sides from the driver's seat 210-1. Also, the first air vent 141-1 may be positioned in a lower portion of the dashboard to blow air towards a lower part (that is, legs) of a driver 200-1.

Further, a second air vent 141-2 may be provided around a passenger's seat 210-2. For example, a pair of second air vents 141-2 may be positioned in the dashboard at left and right sides from the passenger's seat 210-2. Also, the second air vent 141-2 may be positioned in the lower portion of the dashboard to blow air towards a lower part (that is, legs) of a passenger 200-2.

In addition, a third air vent 141-3 may be provided around a left rear seat 210-3. For example, the third air vent 141-3 may be positioned in at least one of a rear portion of a console box between the driver's seat 210-1 and the passenger's seat 210-2 or a filler between a left front door and a left rear door.

Also, a fourth air vent 141-4 may be provided around a right rear seat 210-4. For example, the fourth air vent 141-4 may be positioned in at least one of the rear portion of the console box between the driver's seat 210-1 and the passenger's seat 210-2 or a filler between a right front door and a right rear door.

As described above, the air conditioner 140 may include the air vents 141 located at the positions corresponding to the respective seats. The air conditioner 140 may provide different types of wind to passengers sat on the different seats according to the passengers' preferences through the air vents 141 corresponding to the respective seats, under the control of the controller 130.

The air conditioner 140 may include a motor for driving the fan that generates wind blowing into the indoor space of the vehicle 10, and also include a motor for adjusting a wing member (not shown) provided in the air vents 141 to adjust a direction of the blowing wind.

The storage 150 according to an embodiment of the disclosure may store a measured value collected by the sensing device 120, correlation information between a passenger's bio-signal and an emotion factor, correlation information between a passenger's facial expression and an emotion factor, a passenger's emotion information, an emotion model, and the like. Data stored in the storage 150 may be transmitted to the controller 130.

The storage 150 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium, such as Hard Disk Drive (HDD) and Compact Disc Read Only Memory (CD-ROM), although not limited to these. The storage 150 may be memory implemented as a separate chip, or the storage 150 and the processor may be integrated into a single chip.

Figure 3:
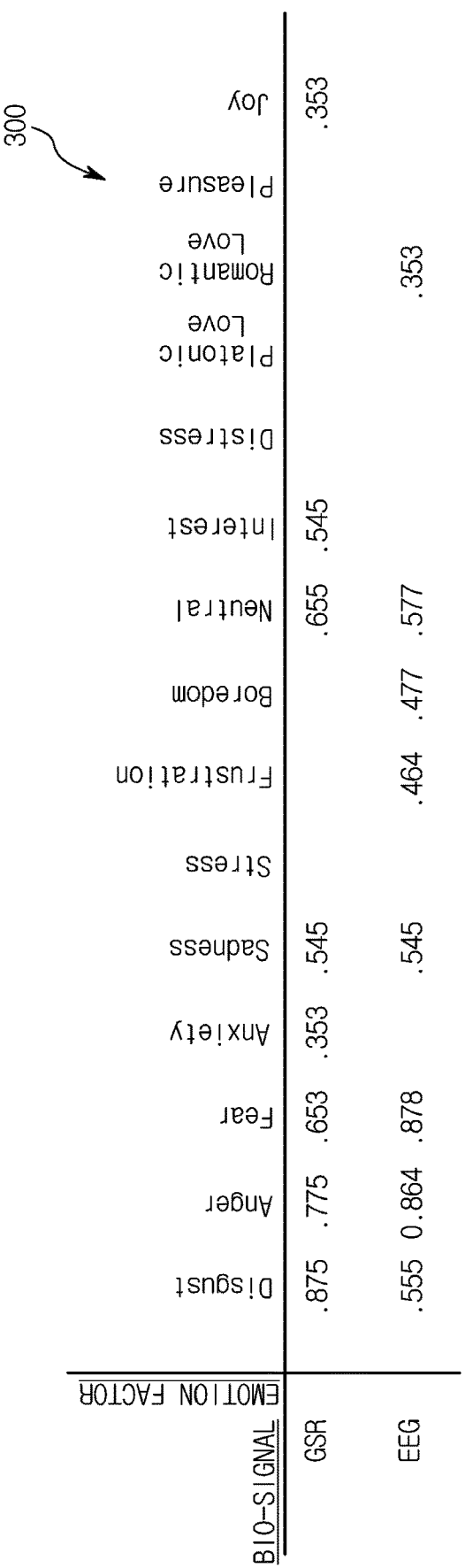
FIG. 3 shows correlation information between bio-signals and emotion factors according to an embodiment of the disclosure.

FIG. 3 shows correlation information between bio-signals and emotion factors according to an embodiment of the disclosure;

In FIG. 3, correlation information between GSR and EEG and emotion factors is shown.

In FIG. 3, a GSR signal has correlation values of 0.875 and 0.775 with emotion factors of Disgust and Anger, respectively, which indicates that the GSR signal has a high relevance with the emotion factors of Disgust and Anger. Therefore, a bio-signal of the passenger 200 collected by the GSR sensor may be the basis on which an emotion of the passenger 200 is determined as an anger emotion or a disgust emotion.

An emotion factor of Joy has a relatively low correlation value of 0.353 with a GSR signal, which indicates that the emotion factor of Joy is less relevant to the GSR signal.

An EEG signal has correlation values of 0.864 and 0.878 with emotion factors of Anger and Fear, respectively, which indicates that the EEG signal has a relatively higher relevance to the emotion factors of Anger and Fear than the other emotion factors. Therefore, a bio-signal collected by the EEG sensor may be the basis on which an emotion of the passenger 200 is determined as an anger emotion or a fear emotion.

In this way, the controller 130 may obtain emotion information of each passenger 200 by using correlation information 300 between bio-signals and emotion factors. However, because the information illustrated in FIG. 3 is experimental results, it may vary depending on experimental environments.

Although correlation information between GSR and EEG and emotion factors is shown in FIG. 3, the correlation information 300 between the bio-signals and the emotion factors may include correlation information between different bio-signals and emotion factors depending on kinds of bio-signals measured by sensors provided in the vehicle 10.

FIG. 4 shows correlation information between facial expressions and emotion factors according to an embodiment of the disclosure.

The controller 130 according to an embodiment of the disclosure may recognize a facial expression of each passenger 200 appearing on an image of the passenger 200 photographed by the camera 110, and obtain emotion information of the passenger 200 by applying a facial action coding system (FACS) to the facial expression of the passenger 200.

More specifically, the controller 130 may extract a plurality of feature points from a face of the passenger 200, and extract a plurality of facial elements by using the extracted feature points. The plurality of facial elements may include eyebrows, eyes, nose, mouth, and the like. The controller 130 may combine patterns of the plurality of facial elements, and compare the combined pattern with correlation information 400 between facial expressions and emotion factors stored in the storage 150. The correlation information 400 between facial expressions and emotion factors may correspond to information representing relations between facial expressions and emotions.

Referring to FIG. 4, the controller 130 according to an embodiment of the disclosure may search a facial expression corresponding to the same pattern as or the most similar pattern to the combined pattern of the passenger 200 in the correlation information 400 between facial expressions and emotion factors, and determine the searched facial expression as a facial expression of the passenger 200.

In addition, the controller 130 may obtain emotion information representing an emotion of the passenger 200 by considering a correlation value for the determined facial expression of the passenger 200 in the correlation information 400 between facial expressions and emotion factors.

For example, when the determined facial expression of the passenger 200 corresponds to a facial expression 2 in the correlation information 400 between facial expressions and emotion factors, the controller 130 may obtain emotion information representing that an emotion of the passenger 200 is a joy emotion having a highest correlation value for the facial expression 2.

In FIG. 4, the correlation information 400 between facial expressions and emotion factors includes a facial expression 1, a facial expression 2, and a facial expression 3, however, the correlation information 400 may further include another facial expression that may represent a passenger's emotion.

In this way, the controller 130 may analyze an image of the inside of the vehicle 10, photographed by the camera 110, to determine a facial expression of each passenger 200 in the vehicle 10 and to obtain emotion information of the passenger 200 based on the determined facial expression.

Figure 5:
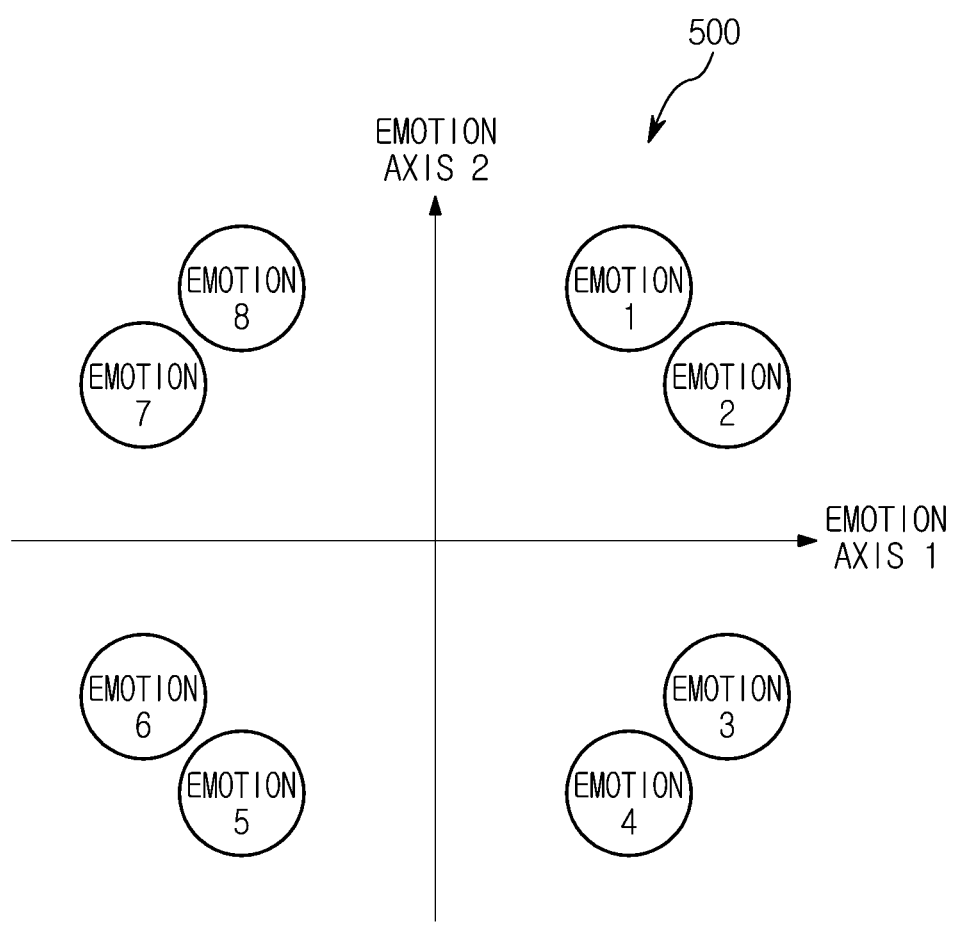
FIG. 5 shows an emotion model according to an embodiment of the disclosure.

FIG. 5 shows an emotion model according to an embodiment of the disclosure.

Referring to FIG. 5, an emotion model 500 may be a graph showing emotions of the passenger 200 classified according to bio-signals of the passenger 200. The emotion model 500 may classify the emotions of the passenger 200 on the basis of predetermined emotion axes. The emotion axes may be determined based on emotions measured from images of the passenger 200 or from bio-signals of the passenger 200. For example, emotional axis 1 may be degrees of positiveness or negativeness, which are measurable by voices or facial expressions of the passenger 200, and emotional axis 2 may be degrees of excitement or activity, which are measurable by GSR or EEG.

When an emotion of the passenger 200 has a high degree of positiveness and a high degree of excitement, the emotion may be classified to emotion 1 or emotion 2. Conversely, when an emotion of the passenger 200 has minus (−) positiveness, i.e., a high degree of negativeness and a high degree of excitement, the emotion may be classified to emotion 3 or emotion 4.

The emotion model may be a Russell's emotion model. The Russell's emotional model may be expressed by a two-dimensional graph based on the x-axis and the y-axis, and may classify emotions to eight areas of joy (0 degrees), excitement (45 degrees), arousal (90 degrees), pain (135 degrees), unpleasant (180 degrees), depression (225 degrees), sleepiness (270 degrees), and relaxation (315 degrees). In addition, the eight areas may be divided to a total of 28 emotions that are classified into similar emotions belonging to the eight areas.

In this way, the controller 130 may obtain emotion information of each passenger 200 by using facial expressions and bio-signals of the passenger 200, the correlation information 300 between bio-signals and emotion factors, the correlation information 400 between facial expressions and emotion factors, and the emotion model 500. Also, the obtained emotion information may be defined as numerical values for positiveness, negativeness, and excitement according to degrees of emotions.

FIG. 6 is a view for describing an air conditioner that is controlled in a vehicle according to an embodiment of the disclosure.

Referring to FIG. 6, the controller 130 according to an embodiment of the disclosure may control the air conditioner 140 to blow a predetermined type of wind based on at least one of an indoor temperature, a bio-signal of the passenger 200, or emotion information of the passenger 200. Types of wind may be classified according to at least ones of temperatures, strengths, or directions of wind blowing to the inside of the vehicle 10 by the air conditioner 140.

More specifically, when an indoor temperature is equal to or higher than a predetermined temperature (for example, 25° C.), the controller 130 may determine that the passenger 200 will feel heat, and determine wind that is below the predetermined temperature and directed to an upper part of the passenger 200, as a predetermined type of wind corresponding to the indoor temperature.

When an indoor temperature is lower than the predetermined temperature, the controller 130 may determine that the passenger 200 will feel cold, and determine wind that is above the predetermined temperature and directed to a middle or lower part of the passenger 200, as a predetermined type of wind corresponding to the indoor temperature.

The predetermined temperature may be set when the vehicle 10 is designed, or may be set by a user of the vehicle 10 and stored in the storage 150. In FIG. 6, the predetermined temperature is set to 25° C. However, the predetermined temperature of 25° C. is an embodiment, and the predetermined temperature may be set to another temperature according to a user's setting.

In addition, the upper part of the passenger 200 may be a body part including a head of the passenger 200 and a part of an upper body of the passenger 200. That is, when the passenger 200 feels heat, the controller 130 may control the air conditioner 140 to blow wind towards the head of the passenger 200 to efficiently reduce the heat felt by the passenger 200

In addition, the middle part of the passenger 200 may be the upper body of the passenger 200, that is, a body part including a trunk of the passenger 200, and the lower part of the passenger 200 may be a body part including the lower body of the passenger 200, that is, the legs of the passenger 200. That is, when the passenger 200 feels cold, the controller 130 may control the air conditioner 140 to blow wind towards the trunk or legs of the passenger 200 to effectively reduce the cold felt by the passenger 200.

When a bio-signal of the passenger 200 is a bio-signal appearing at the predetermined temperature or higher, the controller 130 according to an embodiment of the disclosure may determine that the passenger 200 will feel heat, and determine wind that is below the predetermined temperature and directed to the upper part of the passenger 200 as a predetermined type of wind corresponding to the bio-signal.

In addition, when a bio-signal of the passenger 200 is a bio-signal appearing at a temperature that is lower than the predetermined temperature, the controller 130 may determine that the passenger 200 will feel cold, and determine wind that is above the predetermined temperature and directed to the middle or lower part of the passenger 200 as a predetermined type of wind corresponding to the bio-signal.

Herein, the bio-signal of the passenger 200 may include blood pressure, a heart rate, a sweat rate, a body temperature, etc., as shown in FIG. 6, and may be any bio-signal that may be measured by the bio-signal sensor.

Generally, when the passenger 200 feels heat, blood pressure of the passenger 200 may be lower than a normal blood pressure level (for example, 120/80 mmHg), and a heart rate of the passenger 200 may be higher than a normal heart rate (for example, 60 times/minute to 100 times/minute). In addition, when the passenger 200 feels heat, a current value of a GSR signal may be measured as a high value as a sweat rate increases, and a temperature of the passenger 200 may be higher than a normal temperature (for example, 36.5° C.).

In addition, when the passenger 200 feels cold, blood pressure of the passenger 200 may be higher than a normal blood pressure level and a heart rate of the passenger 200 may be lower than a normal heart rate. In addition, when the passenger 200 feels cold, a current value of a GSR signal may be measured as a low value as a sweat rate decreases, and a temperature of the passenger 200 may be lower than the normal temperature.

Accordingly, the controller 130 may set a threshold upper value and a threshold lower value for each bio-signal, and compare a value indicated by each bio-signal with the corresponding threshold upper value and the corresponding threshold lower value to determine whether the passenger 200 feels heat or cold.

The normal value, the threshold upper value and the threshold lower value of each bio-signal may be set when the vehicle 10 is designed, or may be set by a user of the vehicle 10 and stored in the storage 150.

When emotion information of the passenger 200 is a predetermined emotion appearing at the predetermined temperature or higher, the controller 130 according to an embodiment of the disclosure may determine that the passenger 200 will feel heat, and determine wind that is below the predetermined temperature and directed to the upper part of the passenger 200, as a predetermined type of wind corresponding to the emotion information.

In addition, when emotion information of the passenger 200 is a predetermined emotion appearing at a temperature that is lower than the predetermined temperature, the controller 130 may determine wind that is above the predetermined temperature and directed to the middle or lower part of the passenger 200, as a predetermined type of wind corresponding to the emotion information.

Generally, when the passenger 200 feels heat, the passenger 200 may feel a negative emotion, such as an unpleasant emotion, a tired emotion, and an excited emotion. In addition, when the passenger 200 feels cold, the passenger 200 may also feel a negative emotion, such as a surprised emotion, a strained emotion, and a fearful emotion.

Accordingly, the controller 130 may set a type of emotion when the passenger 200 feels heat and a type of emotion when the passenger 200 feels cold, in advance, and may compare an emotion indicated by emotion information of the passenger 200 with the type of emotion according to heat or cold to determine whether the passenger 200 feels heat or cold.

Herein, the type of emotion when the passenger 200 feels heat and the type of emotion when the passenger 200 feels cold may be set when the vehicle 10 is designed, or may be set by a user of the vehicle 10 and stored in the storage 150.

When an indoor temperature is within a predetermined temperature range, bio-signals of the passenger 200 are within normal numerical ranges, and an emotion of the passenger 200 indicated by emotion information of the passenger 200 corresponds to a neutral or positive emotion, the controller 130 according to an embodiment of the disclosure may determine wind that corresponds to the predetermined temperature and directed to the middle part of the passenger 200, as a predetermined type of wind.

As such, the controller 130 according to an embodiment of the disclosure may control the air conditioner 140 to blow a predetermined type of wind through the air vent 141 corresponding to the position of each passenger 200, based on at least one of an indoor temperature, a bio-signal of the passenger 200, or emotion information of the passengers 200.

For example, the controller 130 according to an embodiment of the disclosure may detect a passenger 200-4 positioned on the right rear seat 210-4 of the vehicle 10, based on at least one of a bio-signal, image data, or a measured value of the seat sensor 122.

Then, the controller 130 may control the air conditioner 140 to blow a predetermined type of wind through the fourth air vent 141-4 corresponding to the position of the passenger 200-4, based on at least one of an indoor temperature, a bio-signal of the passenger 200-4, or emotion information of the passenger 200-4.

In addition, the controller 130 according to an embodiment of the disclosure may compare emotion information of a plurality of passengers 200 to each other to determine a passenger having the most negative emotion information, and may control the air conditioner 140 based on the emotion information of the determined passenger.

In this case, the controller 130 may control the air conditioner 140 to blow a predetermined type of wind, based on at least one of an indoor temperature, a bio-signal of the determined passenger, or the emotion information of the determined passenger. At this time, wind blowing through the individual air vents 141 may be the same type.

Figure 7:
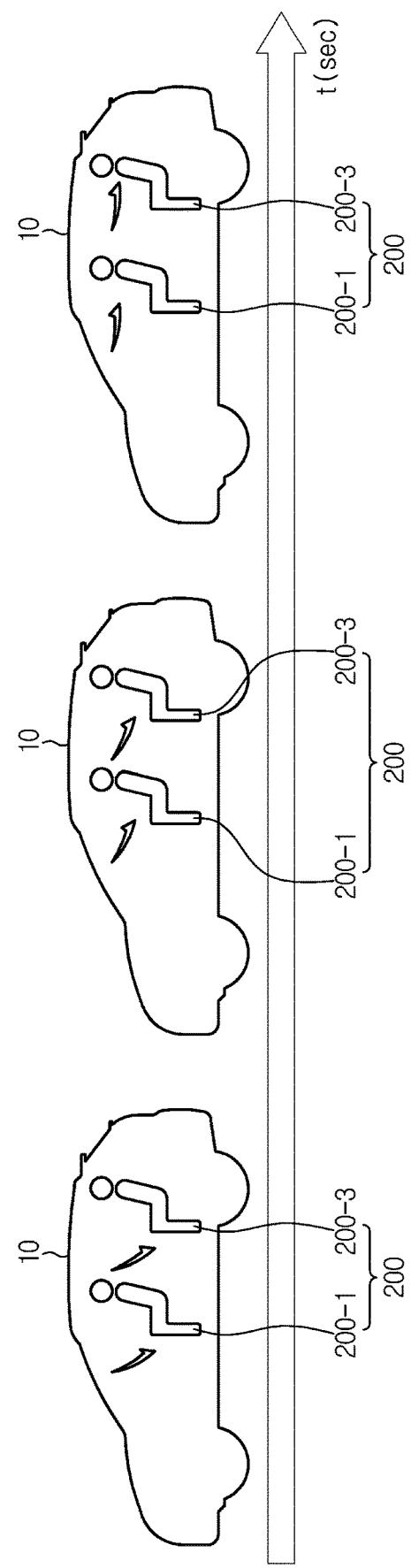
FIG. 7 is a view for describing a case of acquiring a passenger's emotion information for each type of wind by changing the type of wind over time in a vehicle according to an embodiment of the disclosure.
Figure 8:
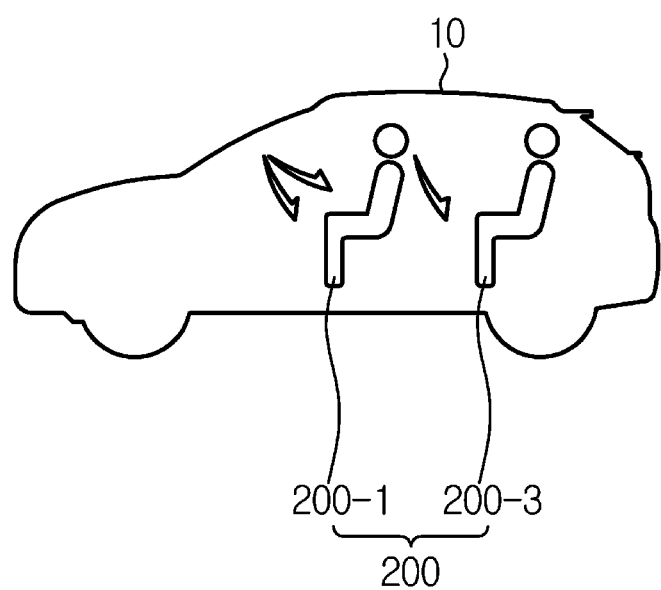
FIG. 8 is a view for describing a case of adjusting the type of wind based on a passenger's emotion information in a vehicle according to an embodiment of the disclosure.

FIG. 7 is a view for describing a case of acquiring a passenger's emotion information for each type of wind by changing the type of wind over time in a vehicle according to an embodiment of the disclosure, and FIG. 8 is a view for describing a case of adjusting a type of wind based on a passenger's emotion information in a vehicle according to an embodiment of the disclosure.

Referring to FIG. 7, when a predetermined condition is satisfied, the controller 130 according to an embodiment of the disclosure may control the air conditioner 140 to change the type of wind blowing at predetermined time intervals.

The predetermined condition may be when a predetermined time elapses from when wind starts being blown through the air conditioner 140, or when a degree of positiveness of emotion information of the passenger 200 obtained after wind starts being blown through the air conditioner 140 is equal to or greater than a threshold level.

That is, when the predetermined time elapses from when the wind starts blowing through the air conditioner 140, the controller 130 may determine that an emotion of the passenger 200 is positive or neutral, and may control the air conditioner 140 to change the type of wind blowing at the predetermined time intervals.

Also, when a degree of positiveness of emotion information of the passenger 200 obtained after wind starts being blown through the air conditioner 140 is equal to or greater than the threshold level, the controller 130 may determine that an emotion of the passenger 200 is positive or neutral, and may control the air conditioner 140 to change the type of wind blowing at the predetermined time intervals.

The predetermined time may correspond to a time for which a change in emotion of the passenger 200 may be induced, and the passenger 200 may feel a certain emotion for a predetermined type of wind for the predetermined time. The predetermined time may be set when the vehicle 10 is designed, or may be set by a user of the vehicle 10 and stored in the storage 150.

For example, as shown in FIG. 7, when the predetermined condition is satisfied, the controller 130 may change the type of wind blowing at predetermined time intervals in the order of wind toward the lower part of the passenger 200, wind toward the middle part of the passenger 200, and wind toward the upper part of the passenger 200. However, the order is an embodiment, and the type of wind may change by changing at least one of a temperature, strength or direction of the wind at the predetermined time intervals.

In addition, as shown in FIG. 7, the changed type of wind may be provided to the passengers 200-1, 200-2, 200-3, and 200-4 through the respective air vents 141-1, 141-2, 141-3, and 141-4 corresponds to the positions of the passengers 200-1, 200-2, 200-3, and 200-4.

When the type of wind blowing at the predetermined time intervals changes, the controller 130 according to an embodiment of the disclosure may obtain emotion information of the passenger 200 corresponding to each type of wind based on at least one of image data or a bio-signal.

The controller 130 according to an embodiment of the disclosure may determine a type of wind for which a degree of negativeness of emotion information is equal to or greater than a threshold level, and may control the air conditioner 140 to blow another type of wind except for the determined type of wind.

That is, the controller 130 may obtain emotion information corresponding to types of wind changing at predetermined time intervals based on at least one of image data or a bio-signal, and control the air conditioner 140 to blow a type of wind for which a degree of positiveness of emotion information is equal to or greater than the threshold level.

In other words, the controller 130 may obtain emotion information of the passenger 200 for each type of wind, and control the air conditioner 140 to exclude a type of wind that causes a negative emotion of the passenger 200, thereby inducing a positive emotion of the passenger 200.

For example, as shown in FIG. 8, the controller 130 may exclude a type of wind directed toward the upper part of the passenger 200-1 from among the types of wind, based on emotion information of the passenger 200-1 positioned on the driver's seat 210-1. In addition, the controller 130 may exclude a type of wind directed toward the upper part and middle part of the passenger 200-3 from among the types of wind, based on emotion information of the passenger 200-3 positioned on the left rear seat 210-3. However, these examples are embodiments, and the controller 130 may control the air conditioner 140 to exclude a type of wind for which a degree of negativeness of emotion information of each of the passengers 200-1, 200-2, 200-3, and 200-4 is equal to or greater than the threshold level.

As such, the vehicle 10 may provide each passenger 200 with a type of wind matching his/her preference, thereby inducing a positive emotion of the passenger 200 in the vehicle 10.

However, the controller 130 may determine that a change in emotion indicated by emotion information of the passenger 200 is not due to the type of wind blowing from the air conditioner 140, according to some embodiments.

More specifically, the controller 130 may determine whether an emotion of the passenger 200 changes according to current circumstance information, based on circumstance information obtained through various sensors installed in the vehicle 10. When the emotion of the passenger 200 changes according to the current circumference information, the controller 130 may determine that a change in emotion indicated by the emotion information of the passenger 200 is not due to a change in type of wind blowing from the air conditioner 140.

In this case, the controller 130 may not control the air conditioner 140 based on the emotion information of the passenger 200.

For example, the controller 130 may determine that the vehicle 10 is in a traffic congestion state, based on a camera photographing a front view or a communicator communicating with an external server, and determine that a change in emotion according to emotion information obtained from a time when the traffic congestion state occurs is not due to a change in type of wind blowing from the air conditioner 140.

As another example, the controller 130 may determine that the passenger 200 is talking on the phone, based on a microphone installed in the vehicle 10, and determine that a change in emotion according to emotion information obtained from a time when the talking on the phone occurs is not due to a change in type of wind blowing from the air conditioner 140.

As another example, the controller 130 may determine that the vehicle 10 makes to a sudden stop, based on a brake position sensor installed in the vehicle 10 and determine that a change in emotion according to emotion information obtained from a time when the sudden stop occurs is not due to a change in type of wind blowing from the air conditioner 140.

Hereinafter, a control method of the vehicle 10 according to an embodiment of the disclosure will be described. The vehicle 10 according to the above-described embodiment of the disclosure may be applied to the control method of the vehicle 10, as will be described below. Therefore, descriptions given above with reference to FIGS. 1 to 8 may be applied to the control method of the vehicle 10 in the same manner, unless otherwise noted.

Figure 9:
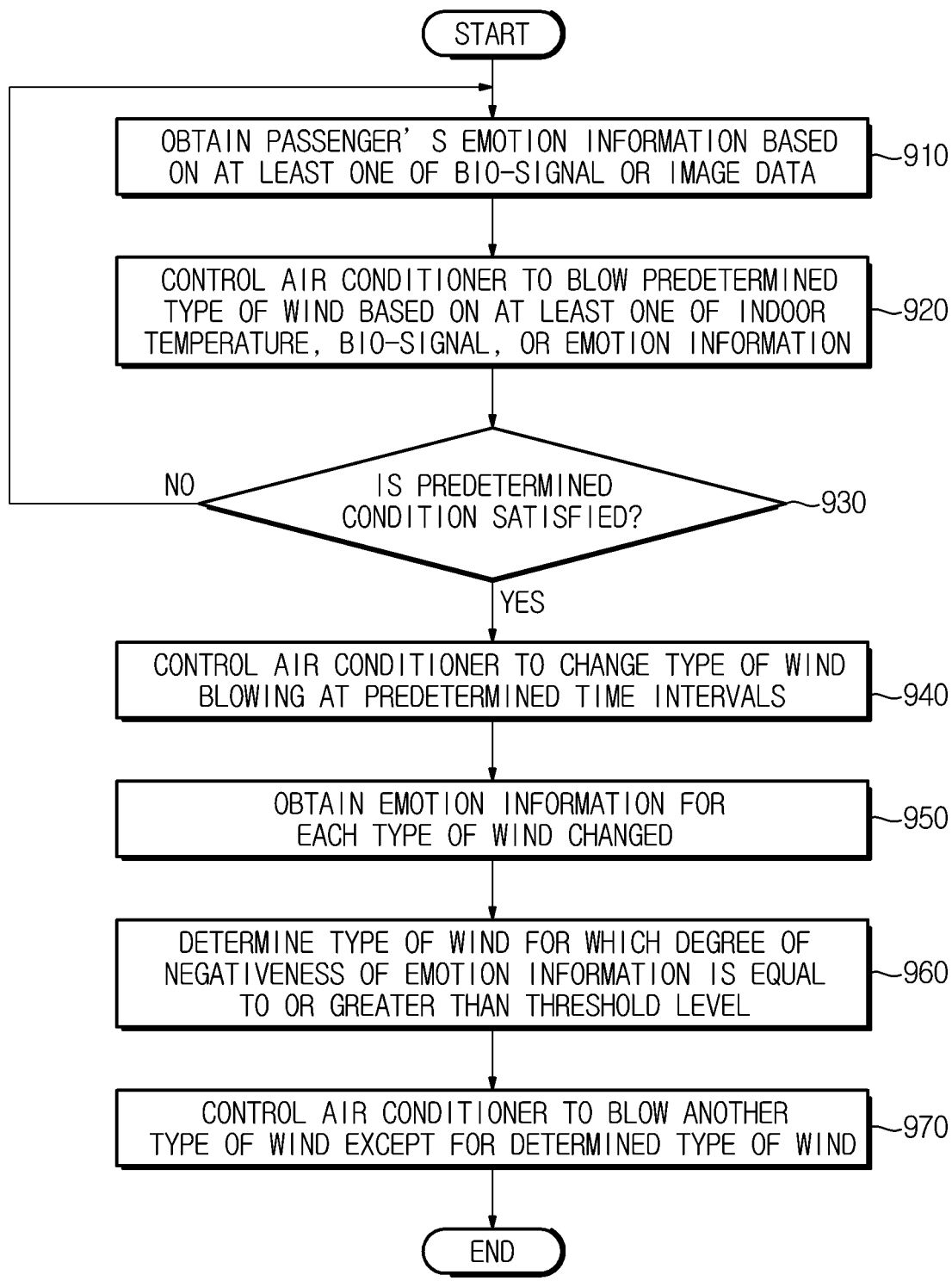
FIG. 9 is a flowchart illustrating a method of controlling an air conditioner in a method of controlling a vehicle according to an embodiment of the disclosure.

FIG. 9 is a flowchart illustrating a method of controlling an air conditioner in a method of controlling a vehicle according to an embodiment of the disclosure.

Referring to FIG. 9, the controller 130 of the vehicle 10 according to an embodiment of the disclosure may obtain emotion information of the passenger 200 based on at least one of a bio-signal or image data, in operation 910.

More specifically, the controller 130 may obtain emotion information representing an emotion of the passenger 200, based on at least one of image data of the passenger 200 obtained from the camera 110 provided in the vehicle 10 or a bio-signal of the passenger 200 obtained from the bio-signal sensor 121 provided in the vehicle 10.

The controller 130 of the vehicle 10 according to an embodiment of the disclosure may control the air conditioner 140 to blow a predetermined type of wind based on at least one of an indoor temperature, a bio-signal, or emotion information, in operation 920.

Types of wind may be classified according to at least ones of temperatures, strengths, or directions of wind blowing to the inside of the vehicle 10.

More specifically, when an indoor temperature is equal to or higher than a predetermined temperature (for example, 25° C.), the controller 130 may determine wind that is below the predetermined temperature and directed to a upper part of the passenger 200, as a predetermined type of wind corresponding to the indoor temperature, and when an indoor temperature is lower than the predetermined temperature, the controller 130 may determine wind that is above the predetermined temperature and directed to a middle or lower part of the passenger 200, as a predetermined type of wind corresponding to the indoor temperature.

In addition, when a bio-signal is a bio-signal appearing at a predetermined temperature or higher, the controller 130 may determine wind that is below the predetermined temperature and directed to the upper part of the passenger 200, as a predetermined type of wind corresponding to the bio-signal, and when a bio-signal is a bio-signal appearing at a temperature that is lower than the predetermined temperature, the controller 130 may determine wind that is above the predetermined temperature and directed to the middle or lower part of the passenger 200, as a predetermined type of wind corresponding to the bio-signal.

Also, when emotion information represents a predetermined emotion appearing at the predetermined temperature or higher, the controller 130 may determine the wind that is below the predetermined temperature and directed to the upper part of the passenger 200, as a predetermined type of wind corresponding to the emotion information, and when emotion information represents a predetermined emotion appearing at a temperature that is lower than the predetermined temperature, the controller 130 may determine wind that is above the predetermined temperature and directed to the middle or lower part of the passenger 200, as a predetermined type of wind corresponding to the emotion information.

The controller 130 may control the air conditioner 140 to change the type of wind blowing at predetermined time intervals when a predetermined condition is satisfied (YES in operation 930), in operation 940.

The predetermined condition may be when a predetermined time elapses from when wind starts being blown through the air conditioner 140, or when a degree of positiveness of emotion information obtained after wind starts being blown through the air conditioner 140 is equal to or greater than a threshold level.

The controller 130 may obtain emotion information for each type of wind changed, in operation 950. That is, when the type of wind blowing at predetermined time intervals changes, the controller 130 may obtain emotion information of the passenger 200 corresponding to each type of wind based on at least one of image data or a bio-signal.

The controller 130 according to an embodiment of the disclosure may determine a type of wind for which a degree of negativeness of emotion information is equal to or greater than the threshold level, in operation 960. That is, the controller 130 may determine a type of wind for which a degree of negativeness of emotion information is equal to or greater than the threshold level, based on emotion information for each type of wind changed. In other words, the controller 130 may determine a type of wind that causes a negative emotion of the passenger 200.

The controller 130 according to an embodiment of the disclosure may control the air conditioner 140 to blow another type of wind except for the determined type of wind, in operation 970. That is, the controller 130 may obtain emotion information of the passenger 200 for each type of wind, and control the air conditioner 140 to exclude a type of wind that causes a negative emotion of the passenger 200, thereby inducing a positive emotion of the passenger 200.

In other words, the controller 130 may obtain emotion information corresponding to each of types of wind changing at predetermined time intervals based on at least one of image data or a bio-signal, and control the air conditioner 140 to blow a type of wind for which a degree of positiveness of emotion information is equal to or greater than the threshold level.

As such, the vehicle 10 may provide each passenger 200 with a type of wind matching his/her preference, thereby inducing a positive emotion of the passenger 200 in the vehicle 10.

However, the controller 130 may determine that a change in emotion represented by emotion information of the passenger 200 is not due to the type of wind blowing from the air conditioner 140, according to some embodiments.

More specifically, the controller 130 may determine whether an emotion of the passenger 200 changes according to current circumstance information, based on circumstance information obtained through various sensors installed in the vehicle 10. When the emotion of the passenger 200 changes according to the current circumference information, the controller 130 may determine that a change in emotion indicated by the emotion information of the passenger 200 is not due to a change in type of wind blowing from the air conditioner 140.

In this case, the controller 130 may not control the air conditioner 140 based on the emotion information of the passenger 200.

For example, the controller 130 may determine that the vehicle 10 is in a traffic congestion state, based on a camera photographing a front view or a communicator communicating with an external server, and determine that a change in emotion according to emotion information obtained from a time when the traffic congestion state occurs is not due to a change in type of wind blowing from the air conditioner 140.

As another example, the controller 130 may determine that the passenger 200 is talking on the phone, based on a microphone provided in the vehicle 10, and determine that a change in emotion according to emotion information obtained from a time when the talking on the phone occurs is not due to a change in type of wind blowing from the air conditioner 140.

As another example, the controller 130 may determine that the vehicle 10 makes to a sudden stop, based on a brake position sensor provided in the vehicle 10 and determine that a change in emotion according to emotion information obtained from a time when the sudden stop occurs is not due to a change in type of wind blowing from the air conditioner 140.

According to the vehicle and the control method as described above, by providing in-vehicle air conditioning in real time based on at least one of indoor temperature, the passenger's bio-signal, or the passenger's emotion to cause a passenger's satisfaction, it may be possible to improve the passenger's riding quality and to minimize the passenger's control of the air conditioner, thereby improving driving convenience and safety.

Meanwhile, the disclosed embodiments may be implemented in the form of recording medium storing instructions that are executable by a computer. The instructions may be stored in the form of program code, and when executed by a processor, the instructions may generate a program module to perform operations of the disclosed embodiments. The recording medium may be implemented as computer-readable recording medium.

The computer-readable recording medium may include all kinds of recording media storing commands that can be interpreted by a computer. For example, the computer-readable recording medium may be Read Only Memory (ROM), Random Access Memory (RAM), a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
   an air conditioner;
   a temperature sensor configured to measure an indoor temperature of the vehicle;
   a camera configured to obtain an image data of a passenger;
   a bio-signal sensor configured to measure a bio-signal of the passenger;
   a front view camera configured to photograph a front view of the vehicle;
   a communicator configured to communicate with an external server;
   a microphone;
   a brake position sensor; and
   a controller configured to
      control the air conditioner to change at least one of a temperature, strength or direction of wind blowing at predetermined time intervals when a predetermined condition is satisfied,
      in response to controlling the air conditioner, obtain emotion information of the passenger based on pre-stored correlation information between the bio-signal and a first emotion factor and pre-stored correlation information between a facial expression obtained from the image data and a second emotion factor,
      determine an adjusted wind direction to be provided by the air conditioner based on the emotion information, and
      control the air conditioner to provide the wind in a direction corresponding to the adjusted wind direction,
      obtain changed emotion information of the passenger in response to controlling the air conditioner in a direction corresponding to the adjusted wind direction,
      obtain information related to a current circumstance including a traffic congestion circumstance determined through the front view camera or the communicator, a phone call circumstance of the passenger determined through the microphone, or a sudden stop circumstance of the vehicle determined through the brake position sensor, and
      determine whether to control the air conditioner based on the changed emotion information and the information related to the current circumstance, wherein the changed emotion information is obtained from a time when the current circumstance occurred.

2. The vehicle according to claim 1, wherein the predetermined condition comprises:
   when a predetermined time elapses from when wind starts being blown through the air conditioner; or
   when a degree of positiveness of emotion information obtained after wind starts being blown through the air conditioner is equal to or greater than a threshold level.

3. The vehicle according to claim 1, wherein the controller is configured to determine that the adjusted wind direction is directed to an upper part of the passenger when the indoor temperature is equal to or higher than a predetermined temperature and to determine that the adjusted wind direction is directed to a middle or lower part of the passenger when the indoor temperature is lower than the predetermined temperature.

4. The vehicle according to claim 1, wherein the controller is configured to determine that the adjusted wind direction is directed to an upper part of the passenger when the bio-signal is a bio-signal appearing at a temperature equal to or higher than a predetermined temperature and to determine that the adjusted wind direction is directed to a middle or lower part of the passenger when the bio-signal is a bio-signal appearing at a temperature lower than the predetermined temperature.

5. The vehicle according to claim 4, wherein the bio-signal sensor comprises a heart rate (HR) sensor configured to measure a heart rate of the passenger.

6. The vehicle according to claim 1, wherein the controller is configured to determine that the adjusted wind direction is directed to an upper part of the passenger when the emotion information represents a predetermined emotion appearing at a temperature equal to or higher than a predetermined temperature and to determine that the adjusted wind direction is directed to a middle or lower part of the passenger when the emotion information represents the predetermined emotion appearing at a temperature lower than the predetermined temperature.

7. The vehicle according to claim 1, further comprising a seat sensor provided in each of a plurality of seats and configured to detect the passenger on the seat, wherein the controller is configured to detect that at least one passenger entered the vehicle based on the bio-signal, the image data, or a measured value of the seat sensor.

8. The vehicle according to claim 7, wherein the controller is configured to control the air conditioner to provide the wind in the adjusted wind direction through an air vent corresponding to the seat on which the at least one passenger is positioned.

9. The vehicle according to claim 7, wherein the at least one passenger comprises a plurality of passengers, and wherein the controller is configured to determine a passenger having a highest degree of negativeness based on emotion information of each of the passengers, and to control the air conditioner based on a bio-signal of the determined passenger or the emotion information of the determined passenger.

10. The vehicle according to claim 4, wherein the bio-signal sensor comprises a skin temperature sensor configured to measure a skin temperature of the passenger.

11. The vehicle according to claim 4, wherein the bio-signal sensor comprises a galvanic skin response (GSR) sensor configured to measure skin electrical conductivity depending on a sweat rate of the passenger.

12. The vehicle according to claim 4, wherein the bio-signal sensor comprises a blood pressure measurement sensor configured to measure blood pressure of the passenger.

13. A method for controlling an air conditioner, the method comprising:
    measuring an indoor temperature of a vehicle;
    obtaining image data of a passenger;
    measuring a bio-signal of the passenger;
    controlling the air conditioner to change at least one of a temperature, strength or direction of wind blowing at predetermined time intervals when a predetermined condition is satisfied;
    in response to controlling the air conditioner, obtaining emotion information of the passenger based on pre-stored correlation information between the bio-signal and a first emotion factor and pre-stored correlation information between a facial expression obtained from the image data and a second emotion factor;
    determining an adjusted wind direction that is to be provided by the air conditioner based on the emotion information;
    controlling the air conditioner to provide wind corresponding to the adjusted wind direction,
    obtaining changed emotion information of the passenger in response to controlling the air conditioner corresponding to the adjusted wind direction;
    obtaining information related to a current circumstance including a traffic congestion circumstance determined through a front view camera or a communicator, a phone call circumstance of the passenger determined through a microphone, or a sudden stop circumstance of the vehicle determined through a brake position sensor; and
    determine whether to control the air conditioner based on the changed emotion information and the information related to the current circumstance, wherein the changed emotion information is obtained from a time when the current circumstance occurred.

14. The method according to claim 13, wherein the predetermined condition occurs when a predetermined time elapses from when wind starts being blown through the air conditioner.

15. The method according to claim 13 wherein determining the adjusted wind direction comprises:
    determining a wind direction directed to an upper part of the passenger when the indoor temperature is equal to or higher than a predetermined temperature; and
    determining a wind direction directed to a middle or lower part of the passenger when the indoor temperature is lower than the predetermined temperature.

16. The method according to claim 13 wherein determining the adjusted wind direction comprises:
    determining a wind direction directed to an upper part of the passenger when the bio-signal is a bio-signal appearing at a temperature equal to or higher than a predetermined temperature; and
    determining a wind direction directed to a middle or lower part of the passenger when the bio-signal is a bio-signal appearing at a temperature lower than the predetermined temperature.

17. The method according to claim 16, wherein measuring the bio-signal comprises measuring a heart rate of the passenger, a skin temperature of the passenger, a skin electrical conductivity depending on a sweat rate of the passenger, or a blood pressure of the passenger.

18. The method according to claim 13 wherein determining the adjusted wind direction comprises:
    determining a wind direction directed to an upper part of the passenger when the emotion information represents a predetermined emotion appearing at a temperature equal to or higher than a predetermined temperature; and
    determining a wind direction directed to a middle or lower part of the passenger when the emotion information represents the predetermined emotion appearing at a temperature lower than the predetermined temperature.

19. The method according to claim 13, wherein the vehicle further comprising a seat sensor provided in each of a plurality of seats, the method further comprising detecting that at least one passenger entered the vehicle based on the bio-signal, the image data, or a measured value of the seat sensor.

20. The method according to claim 19, further comprising controlling the air conditioner to blow wind in the adjusted wind direction through an air vent corresponding to the seat on which the at least one passenger is positioned, based on the indoor temperature, the bio-signal of the at least one passenger or emotion information of the at least one passenger.

21. The method according to claim 19, wherein the at least one passenger comprises a plurality of passengers, the method further comprising:
    determining a passenger having a highest degree of negativeness based on emotion information of each of the plurality of passengers; and controlling the air conditioner based on the bio-signal of the determined passenger or emotion information of the determined passenger.

22. The method according to claim 13, wherein the predetermined condition occurs when a degree of positiveness of emotion information obtained after wind starts being blown through the air conditioner is equal to or greater than a threshold level.

23. A vehicle comprising:
a vehicle body;
a plurality of seats within the vehicle body;
a plurality of seat sensors, each seat sensor provided in a corresponding seat and configured to detect a presence of a passenger on the corresponding seat;
an air conditioner;
a temperature sensor configured to measure an indoor temperature of the vehicle;
a camera configured to obtain an image data of the passenger;
a bio-signal sensor configured to measure a bio-signal of the passenger;
a front view camera configured to photograph a front view of the vehicle;
a communicator configured to communicate with an external server;
a microphone;
a brake position sensor; and
a controller configured to
determine which seats are occupied by a passenger based on information from the seat sensors,
control the air conditioner to change at least one of a temperature, strength or direction of wind blowing at predetermined time intervals when a predetermined condition is satisfied,
in response to controlling the air conditioner, obtain emotion information of each passenger based on pre-stored correlation information between the bio-signal and a first emotion factor and pre-stored correlation information between a facial expression obtained from the image data and a second emotion factor,
determine which of the passengers has a highest degree of negativeness based on the emotion information of each of the passengers,
determine an adjusted wind direction to be provided by the air conditioner based on the emotion information of the passenger determined to have the highest degree of negativeness,
control the air conditioner to provide the wind in a direction corresponding to the adjusted wind direction,
obtain changed emotion information each passenger in response to controlling the air conditioner in a direction corresponding to the adjusted wind direction,
obtain information related to a current circumstance of the vehicle including a traffic congestion circumstance determined through the front view camera or the communicator, a phone call circumstance of the passenger determined through the microphone, or a sudden stop circumstance of the vehicle determined through the brake position sensor, and
determine whether to control the air conditioner based on the changed emotion information and the information related to the current circumstance, wherein the changed emotion information is obtained from a time when the current circumstance occurred.

24. The vehicle according to claim 23, wherein the controller is configured to determine that the adjusted wind direction is directed to an upper part of the passenger when the emotion information represents a predetermined emotion appearing at a temperature equal to or higher than a predetermined temperature and to determine that the adjusted wind direction is directed to a middle or lower part of the passenger when the emotion information represents the predetermined emotion appearing at a temperature lower than the predetermined temperature.

* * * * *